US012584943B2

(12) United States Patent
Hantschel et al.

(10) Patent No.: US 12,584,943 B2
(45) Date of Patent: Mar. 24, 2026

(54) METHOD FOR PRODUCING A SUBSTRATE COMPRISING MULTIPLE TIPS FOR SCANNING PROBE MICROSCOPY

(71) Applicant: IMEC VZW, Leuven (BE)

(72) Inventors: Thomas Hantschel, Houtvenne (BE); XiuMei Xu, Bertem (BE)

(73) Assignee: IMEC VZW, Leuven (BE)

( * ) Notice: Subject to any disclaimer, the term of this patent is extended or adjusted under 35 U.S.C. 154(b) by 376 days.

(21) Appl. No.: 18/524,772

(22) Filed: Nov. 30, 2023

(65) Prior Publication Data

US 2024/0175896 A1 May 30, 2024

(30) Foreign Application Priority Data

Nov. 30, 2022 (EP) ..................................... 22210487

(51) Int. Cl.
*G01Q 70/16* (2010.01)
*G01Q 70/06* (2010.01)

(52) U.S. Cl.
CPC ............. *G01Q 70/16* (2013.01); *G01Q 70/06* (2013.01)

(58) Field of Classification Search
CPC ......... G01Q 70/16; G01Q 70/06; G01Q 70/08
USPC ......................................... 850/55
See application file for complete search history.

(56) References Cited

U.S. PATENT DOCUMENTS 6,960,528 B2 11/2005 Chen et al.
7,476,787 B2 1/2009 Thomas et al.

8,308,968 B2 11/2012 Cohen et al.
9,522,821 B2 12/2016 Cui et al.
10,433,542 B2 10/2019 Xu
10,989,736 B1 4/2021 Brown et al.
11,955,368 B2* 4/2024 Hantschel ......... H01L 21/02527
(Continued)

FOREIGN PATENT DOCUMENTS

CN 101819219 A 9/2010
CN 111943130 A 11/2020
(Continued)

OTHER PUBLICATIONS

Extended European Search Report and European Search Opinion, Application No. EP 22210487.9, mailed May 26, 2023, 8 pages.
(Continued)

*Primary Examiner* — Michael Maskell
(74) *Attorney, Agent, or Firm* — McDonnell Boehnen Hulbert & Berghoff LLP

(57) ABSTRACT

One embodiment of the present disclosure is related to a method for producing a substrate comprising a plurality of tips suitable to be used in scanning probe microscopy (SPM), wherein as a first step, a substrate is produced or provided comprising a plurality of nano-sized tips, preferably arranged in a regular array and spaced apart by nano-sized interspacings. A mask is applied to this substrate, comprising multiple mask portions, wherein each mask portion covers at least one tip, whereafter the substrate is subjected to an etching process relative to the mask portions. After the removal of the mask portions, the method results in the creation of a substrate comprising multiple pedestals having each at least one nanotip on the upper surface thereof and spaced apart at a distance suitable for performing an SPM measurement of a given type.

20 Claims, 8 Drawing Sheets

(56)  References Cited

U.S. PATENT DOCUMENTS

| | | | |
|---|---|---|---|
| 2015/0309073 A1* | 10/2015 | Mirkin | G01Q 70/06 |
| | | | 427/532 |
| 2016/0068384 A1* | 3/2016 | Cui | H01L 21/32139 |
| | | | 257/618 |
| 2018/0213772 A1* | 8/2018 | Xu | B82B 3/0014 |
| 2021/0123948 A1 | 4/2021 | Brown et al. | |
| 2021/0263069 A1 | 8/2021 | Brueck et al. | |

FOREIGN PATENT DOCUMENTS

| | | | |
|---|---|---|---|
| EP | 1203749 A1 | 5/2002 |
| EP | 3809143 A1 | 4/2021 |

OTHER PUBLICATIONS

Hsu, Chih-Hsun, Hung-Chun Lo, Chia-Fu Chen, Chien Ting Wu, Jih-Shang Hwang, Debajyoti Das, Jeff Tsai, Li-Chyong Chen, and Kuei-Hsien Chen. "Generally applicable self-masked dry etching technique for nanotip array fabrication." Nano letters 4, No. 3 (2004): 471-475.

Zhang, Xinshuai, Jing Liu, Bo Wang, Tianchong Zhang, and Futing Yi. "Fabrication of silicon nanotip arrays with high aspect ratio by cesium chloride self-assembly and dry etching." AIP Advances 4, No. 3 (2014).

Wu, Chi-Chang, Keng-Liang Ou, and Ching-Li Tseng. "Fabrication and characterization of well-aligned and ultra-sharp silicon nanotip array." Nanoscale research letters 7 (2012): 1-6.

* cited by examiner

FIG. 5a                    FIG. 5b

METHOD FOR PRODUCING A SUBSTRATE COMPRISING MULTIPLE TIPS FOR SCANNING PROBE MICROSCOPY

CROSS-REFERENCE TO RELATED APPLICATIONS

The present application is a non-provisional patent application claiming priority to European Patent Application No. EP 22210487.9, filed Nov. 30, 2022, the contents of which are hereby incorporated by reference.

FIELD OF THE DISCLOSURE

The present disclosure is related to methods and tools for performing scanning probe microscopy (SPM) measurements. SPM is the general term for a number of material characterization and imaging techniques, such as atomic force microscopy (AFM) or scanning spreading resistance microscopy (SSRM).

BACKGROUND

Most SPM configurations utilize a probe that is scanned relative to a material sample. The probe comprises an elongate strip attached at one end to a holder and carrying at its other end a tip. The strip is referred to as the cantilever of the probe, while the tip may be a pyramid-shaped body attached to the plane of the cantilever. During an SPM acquisition, the tip is placed in contact to or in close proximity with a surface of the sample and the probe is scanned along a given trajectory, usually a set of parallel lines. The interaction between the tip and the surface is translated into topographical, electrical or magnetic data of the surface, or into signals related to the composition of a sample, depending on the characteristics of the tip and the measurement setup. The probe may be in continuous contact with the surface under investigation, or an intermittent contact mode may be applied, wherein the surface charac- teristics are measured by detecting changes in the impedance (electrical or other) of the probe-surface connection. A contactless mode is equally applicable, when the interaction between the probe and the surface is dominated by non- contact forces such as Vanderwaals forces.

In a number of contact-based SPM type measurements, the tip deteriorates after a number of scans, so that repeated replacements of the tip are required. Also, when different types of SPM measurements are performed on the same sample, this requires the exchanging of one type of probe for another, which is often a complex and time-consuming operation, both in terms of actually replacing the probe and in terms of relocating the region of interest on the sample.

The "reverse setup" has therefore been developed. This term refers to the attachment of a sample to a cantilever and the scanning of the sample with respect to a substrate comprising several tips. This is illustrated for example in patent publication document EP3809143. So far, methods applied for fabricating a "tip substrate" are primarily based on fabrication methods for producing cantilever-based tips, such as the production of pyramid-shaped cavities in a Si substrate, the filling of the openings with tip material such as diamond, and the transferring of the diamond tips to a carrier substrate. These techniques often fail to produce a large number of tips, as would be required for the application of SPM-based methods on an industrial scale, for example in a semiconductor fabrication environment. There is a need therefore for a production method of a tip substrate suitable for such large-scale SPM applications.

SUMMARY

The present disclosure is related to a method for produc- ing a substrate comprising a plurality of tips suitable to be used in scanning probe microscopy (SPM), wherein as a first step, a substrate is produced or provided comprising a plurality of nano-sized tips, such as may be arranged in a regular array and spaced apart by nano-sized interspacings. A mask is applied to this substrate, comprising multiple separate mask portions, wherein each mask portion covers at least one tip, whereafter the substrate is subjected to an etching process relative to the mask portions. After the removal of the mask portions, the method results in the creation of a substrate comprising multiple pedestals having each at least one nanotip on the upper surface thereof and spaced apart at a distance suitable for performing an SPM measurement of a given type, such as AFM or SSRM. The tips may be coated with a functional coating, for example a diamond or doped diamond coating, either before or after the steps of mask formation, etching and mask removal.

The method enables the fabrication of a substrate com- prising several thousands or millions of SPM tips and allowing to perform large numbers of consecutive SPM measurements in quick succession, for example in a semi- conductor fabrication environment. The present disclosure is also related to such a substrate.

In another embodiment, the present disclosure further relates to the use of a substrate comprising a plurality of nano-sized tips not located on top of respective pedestals and interspaced at distances smaller than 1 micrometer, in an SPM measurement performed on a sample of suitably small dimensions.

According to one embodiment, the present disclosure is related to a method for producing a substrate comprising multiple tips for scanning probe microscopy, the method comprising the steps of:

providing a substrate comprising a plurality of nano-sized tips on its surface, the tips being integral with the material of the substrate, wherein the distance between any two adjacent tips is smaller than 1 micrometer. The distance is to be measured between corresponding points on two adjacent tips, for example between the central axis of two tips.

producing a mask on the substrate, the mask comprising a plurality of separate mask portions, wherein each mask portion covers at least one nano-sized tip, selectively etching the substrate relative to the mask portions, in the region surrounding the mask portions, to thereby obtain a plurality of pedestals, with at least part of the mask portions remaining on top of the pedestals and covering at least one tip, removing the mask portions, to thereby obtain a plurality of pedestal/tip combinations, each combination com- prising one pedestal having at least one nano-sized tip on its upper surface.

The dimensions of the pedestals and the number of tips on each pedestal enable a particular type of SPM measurement to be performed using each one of a given plurality of adjacent pedestal/tip combinations.

According to another embodiment, the plurality of nano- sized tips forms a regular 2-dimensional array of tips prior to producing the mask.

According to an embodiment, the tips have a diameter at the base between 10 nm and 50 nm and a height between 50 nm and 800 nm and the distance between any two adjacent tips is between 50 nm and 500 nm.

According to an embodiment, the pedestals may be arranged according to a regular two-dimensional array. According to an embodiment, the pitch of the regular array of the pedestals is between 10 μm and 25 μm.

According to an embodiment, after the removal of the mask portions, each pedestal comprises one tip on its upper surface. According to other embodiments, each pedestal comprises two, three, four or five tips on its upper surface.

According to an embodiment, the pedestals are conical in shape, having a broader base and a narrower top, the top carrying the at least one tip.

According to an embodiment, the substrate surface area is at least one hundred square centimeters.

According to an embodiment, the tips comprise a coating at the time of producing the mask portions.

According to an embodiment, a coating is applied on the tips after producing the pedestals and removing the mask portions.

According to an embodiment, at least one mask portion covers multiple nanotips, wherein the step of selectively etching the substrate is configured to partially underetch the mask portion from the sides, so that a mushroom-shaped mask portion remains at the end of the etch operation, the mushroom shaped portion covering at least one but not all of the tips originally covered by the mask portion prior to the etching step.

According to an embodiment, positioning the mask portions relative to the nano-sized tips involves an alignment step so that the mask portions are aligned to respective tips or groups of tips.

The present disclosure is also related to a substrate comprising a plurality of tips suitable for SPM measurements, wherein the substrate comprises a plurality of pedestals, each comprising a base and a top surface, and wherein at least one nano-sized tip is located on the top surface of each pedestal.

According to an embodiment of the substrate, the pedestals are arranged according to a regular two-dimensional array.

According to another embodiment, the present disclosure relates to the use of a substrate comprising a plurality of nano-sized tips on its surface, the tips being integral with the material of the substrate and interspaced at distances lower than 1 micrometer from each other, for performing an SPM measurement, by attaching a sample to an apex region of a tip-shaped sample carrier attached at the end of a cantilever, and moving the sample relative to one or more of the tips.

BRIEF DESCRIPTION OF THE DRAWINGS

FIGS. 5a to 5c illustrate a variant wherein a mask portion covers two nanotips of the array according to the disclosed embodiments.

DETAILED DESCRIPTION

Figure 1A:
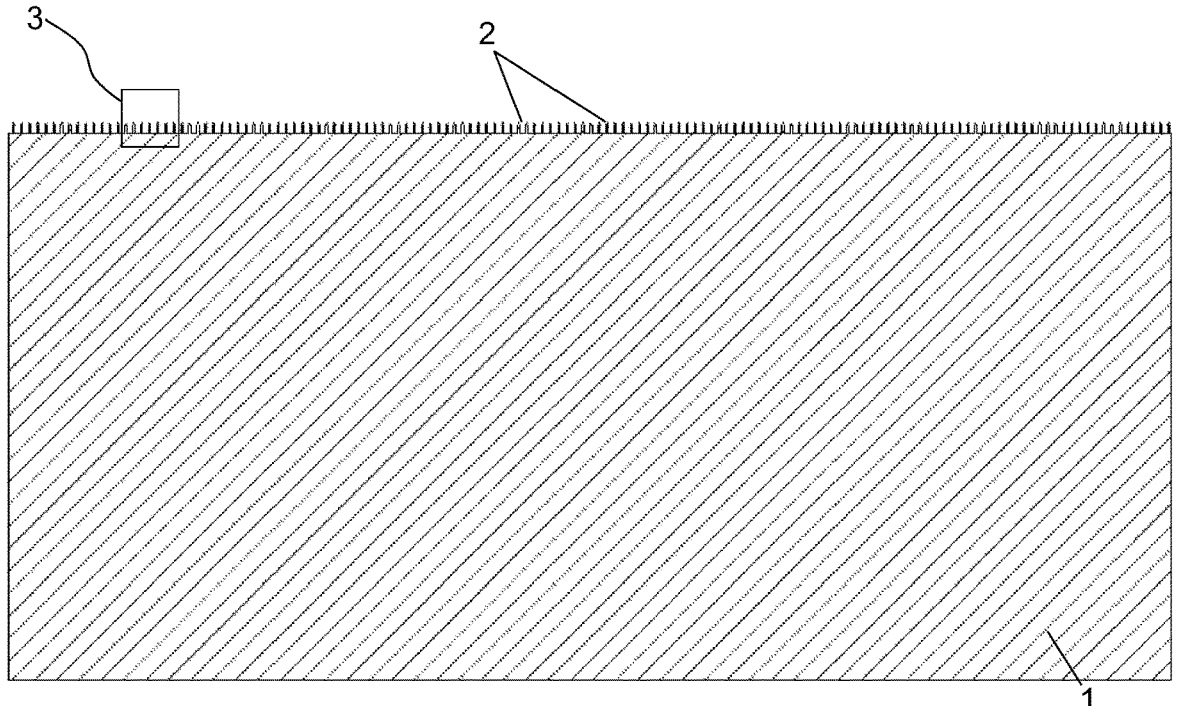
FIGS. 1a and 1b illustrate portions of a substrate comprising a nanotip array on its surface according to the disclosed embodiments.

FIG. 1a illustrates a substrate 1 comprising a regular array of nano-sized tips 2, hereafter also referred to as "nanotips" on its surface. The image shows a vertical section of a portion of the substrate, the portion having a width of about 15 μm and a thickness of about 7 μm. It will be understood that the illustrated substrate represents a small portion of a substrate which may have a diameter of up to 300 mm and a thickness of several hundreds of micrometers. The substrate may consist of a single material, or it may be a top layer consisting of a single material and lying on top of a wafer or substrate formed of one or more other materials. The substrate may for example be a 300 mm Si process wafer, but other materials are possible, such as quartz, metal, diamond, oxide, sapphire or III-V semiconductor materials.

The tips 2 are integral with the substrate, i.e. they are obtained by removing material from a substrate having a planar upper surface, in areas around well-defined positions of the tips. This may be realized by DUV or EUV lithography, applying a lithographic mask that defines the tip positions, illuminating a resist layer, developing and stripping the resist, and transferring the obtained resist pattern to a hardmask layer and subsequently to the substrate itself.

Figure 1B:
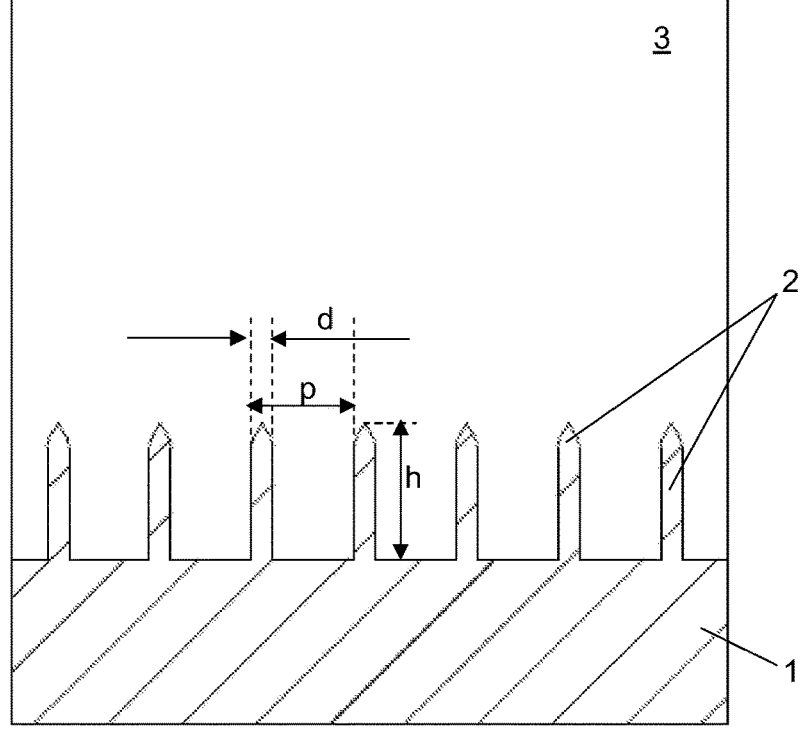

The tips 2 are nano-sized, i.e. transverse and longitudinal dimensions of the tips are in the order of nanometers, tens of nanometers or hundreds of nanometers, but lower than 1 micrometer. According to embodiments which are however not limiting the scope of the present disclosure, the diameter of the tips, as measured at the base, may be between 10 nm and 50 nm, the height of the tips from the base to the distal end may be between 50 nm and 800 nm and the pitch of the tip array may be between 50 nm and 500 nm. In the example shown and with reference to the detail 3, as represented in FIG. 1b, the tips 2 have a height h of about 120 nm, a diameter d at the base of about 20 nm and the array has a pitch p of about 100 nm. The array is a regular 2-dimensional array, stretching out across the surface of the substrate in 2-directions, i.e. also in the direction perpendicular to the face of the drawing in FIGS. 1a and 1b. A regular array is an array with constant pitch in two orthogonal directions x and y. The pitch p may however be different in the x and y directions. Other distributions, including hexagonal or staggered distributions, as well as more random distributions of nano-sized tips are also possible within the scope of the present disclosure, wherein the dimensions of the tips and the interspacing between adjacent tips is however in the same order of magnitude as described above, i.e. in the order of nanometers, tens or hundreds of nanometers but smaller than 1 micrometer.

Methods for producing the tip array, for example on a monocrystalline silicon substrate, are known in the prior art, and described for example in patent publication document U.S. Ser. No. 10/433,542B2, which includes a detailed description of the method, using DUV immersion lithography (193 nm) and plasma etching ($CH_2F_2$/$SF_6$/$N_2$ based chemistry) applied on a monocrystalline Si process wafer.

These tip arrays are presently used as antimicrobial surfaces or as plasmonic nanostructured surfaces for molecular detection techniques such as surface-enhanced Raman spectroscopy (SERS).

As seen in FIG. 1b, the tips 2 in this particular example have a sharp ending at the distal and of the tips. The present disclosure is not limited to tips of this shape, but a sharp tip apex is nevertheless desirable for many SPM applications. The dimensions, shape and sharpness of the tips can be controlled by adjusting certain process parameters of the litho/etch process applied for fabricating the tips 2. Which parameters to adjust and how to adjust them is known to the skilled person who is familiar with methods for producing these nano-sized tip arrays. For example, in order to obtain a sharp tip as illustrated in the drawings, a mask material that is gradually consumed during the plasma etch process may be utilized. Of course, being a mask material (hardmask or resist), it is consumed at a slower rate than the tip material, so that the tips are formed down to their base when the mask material is fully consumed. At this moment however, the tips may not yet have a sharp apex. Etching is then continued during a brief period, configured so that the tip sharpens while the rest of the tip essentially maintains its width. To obtain this sharpening effect, the mask material and its thickness as well as the etch time need to be carefully selected and controlled. As stated, details regarding the adjustment of these parameters to obtain the desired shape are within the knowledge of the skilled person.

At the lower end of the range of the tip diameter, i.e. in the vicinity of 10 nm, the tip sharpness may be sufficient even without further sharpening the apex region. At higher diameters, the sharpening is generally required to ensure a sufficiently high spatial resolution.

The method of the present disclosure is applicable on a substrate comprising a tip array as illustrated in FIGS. 1a and 1b. For dedicated SPM applications, the tips may be provided with a functional coating (not shown in the drawing) of a few nanometers thick, which may for example improve the wear resistance of the tip, increase the tip conductivity, make the tip magnetic, or chemically functionalize the tip. Wear resistance coatings could be hard metallic alloys such as TiN, diamond, and diamond like carbon (DLC). Conductive coatings could be metals or metallic alloys such as Pt, PtIr, Au or Ni. Magnetic coatings could be metals or metallic alloys such as Co or CoCr. Chemical functionalization is critical for chemical force microscopy and single molecule detection applications, where different self-assembled monolayers (SAMs) with specific chemical functional groups need to be grafted on the tips. Such chemical modifications can be achieved by silanization, etherification, hydrosilylation, or through the immobilization of alkane thiols. Applicable thicknesses and materials of these coatings are known from standard SPM technology where the tip is attached to a cantilever, and the same parameters are applicable in the context of the present disclosure. These functional coatings might be applied by different methods such as physical vapor deposition (PVD), atomic layer deposition (ALD), or chemical vapor deposition (CVD).

Figure 2A:
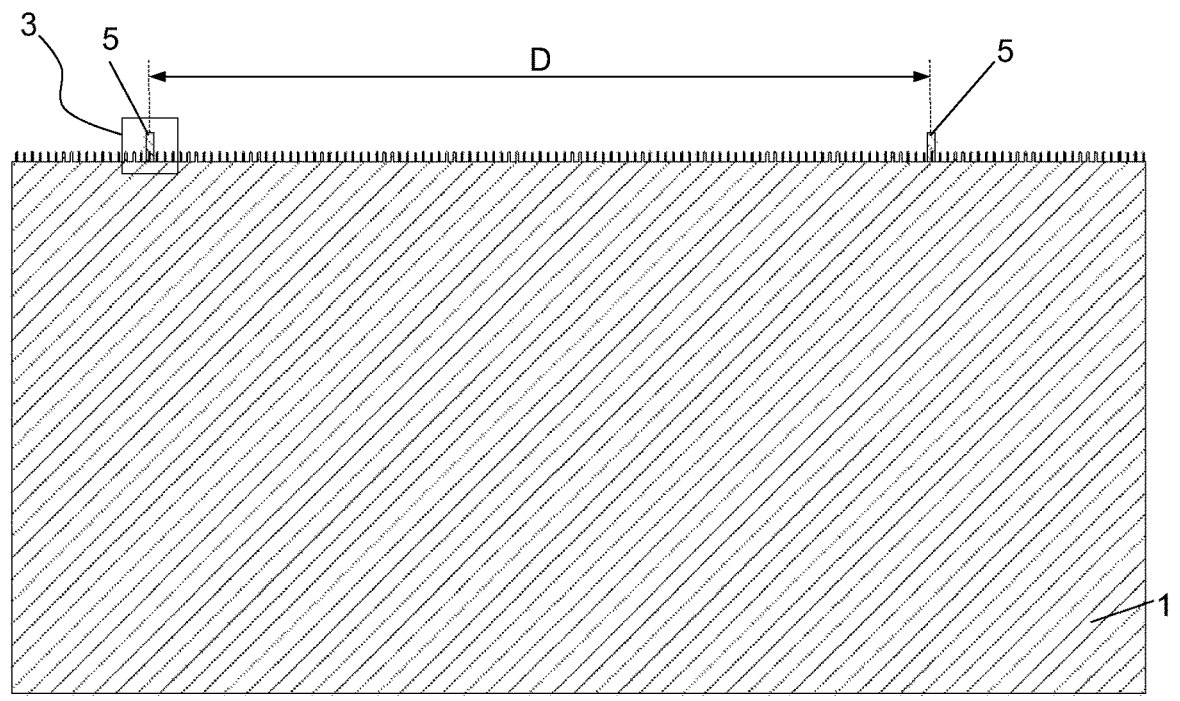
FIGS. 2a and 2b illustrate the creation of mask portions on the nanotip array according to the disclosed embodiments.
Figure 2B:
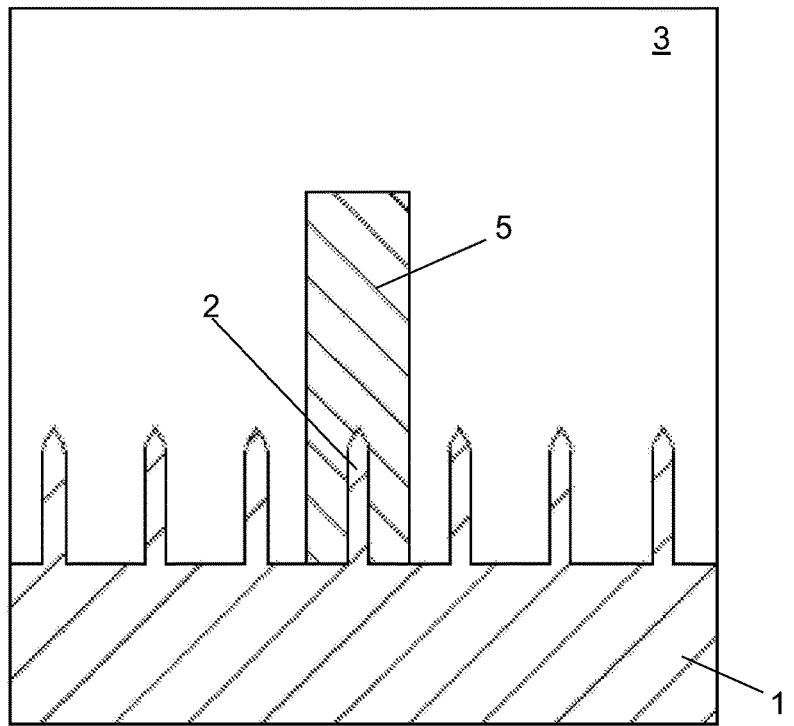

The first method step of a method according to embodiments of the present disclosure is the provision of a patterned mask on the substrate 1, as illustrated in FIGS. 2a and 2b. The mask may be a hardmask layer such as amorphous carbon, SOC (spin-on-carbon), SOG (spin-on-glass) or any other suitable material, obtainable by depositing this material in an even layer across the full substrate surface, thereby covering the tip array, and patterning this layer by lithography and etching techniques. The hardmask pattern comprises small portions 5 of masking material, which each cover at least one nanotip 2. In the example shown, the portions 5 have a more or less circular cross section of about 100 nm in diameter, and each portion 5 is perfectly coaxial with exactly one tip 2. The mask portions 5 may however be out of center with respect to the covered tips, as long as at least one tip is completely covered by the masking material. In the example shown, the masking portions 5 are about 10 μm apart as indicated by the distance D in FIG. 2a, in the direction of the drawing, as well as in the direction perpendicular thereto. The portions 5 thereby form a further 2-dimensional array across the full surface of the substrate. For example on an area of 10 by 10 centimeters of a 300 mm Si wafer, about 108 mask portions 5 may be formed.

Figure 3A:
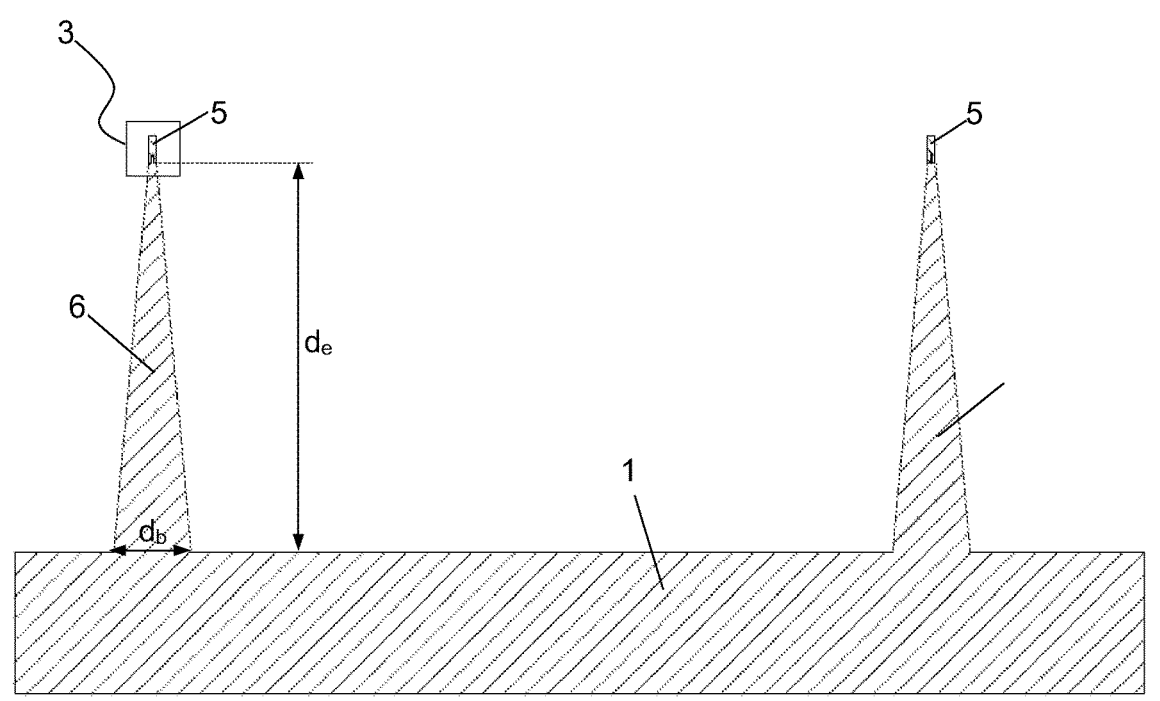
FIGS. 3a and 3b illustrate the result of an etch step wherein substrate material is removed relative to the mask portions according to the disclosed embodiments.

Then the substrate itself is subjected to an etch process that is selective with respect to the masking material. For a Si substrate, this may be done by dry etching, for example by the known DRIE technique (deep reactive ion etching), wherein the material of the substrate is removed down to a given depth. If the tips are coated, different etch recipes may be required, starting with a first etch recipe for removing the coating, and using another chemistry for removing the substrate material. The result of this step is illustrated in FIG. 3a, with an exemplary etch depth de of about 5 μm. This is merely an example and the etch depth may differ from this value. Typical etch depths may be between 2 μm and 15 μm for example. The removal of the substrate material has resulted in an array of conical pedestals 6, the height thereof being determined by the etch depth, i.e. about 5 μm in the example shown. Still in the example shown, the pedestals 6 have a base diameter $d_b$ of about 1 μm and a top diameter $d_t$ of about 100 nm, as determined by the diameter of the masking portions 5.

Figure 3B:
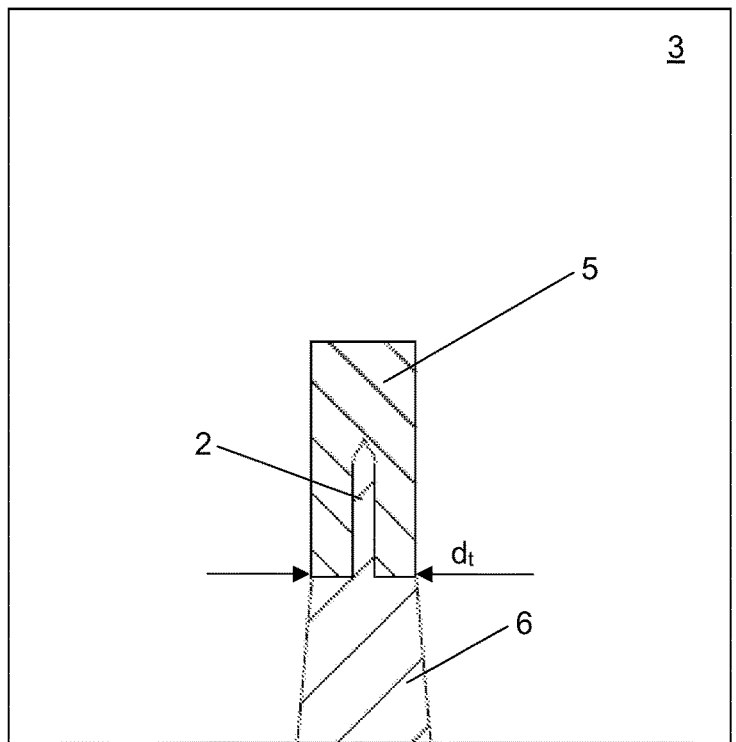

As the etch process is not 100% selective, the masking material may be partly thinned, as illustrated in FIG. 3b. Due to the same effect, the diameter $d_t$ may be slightly smaller than the original diameter of the mask portions 5. This sideways thinning is not represented in FIG. 3b. Enough masking material is left however to leave the nanotips 2 covered at the end of the etch process.

Figure 4A:
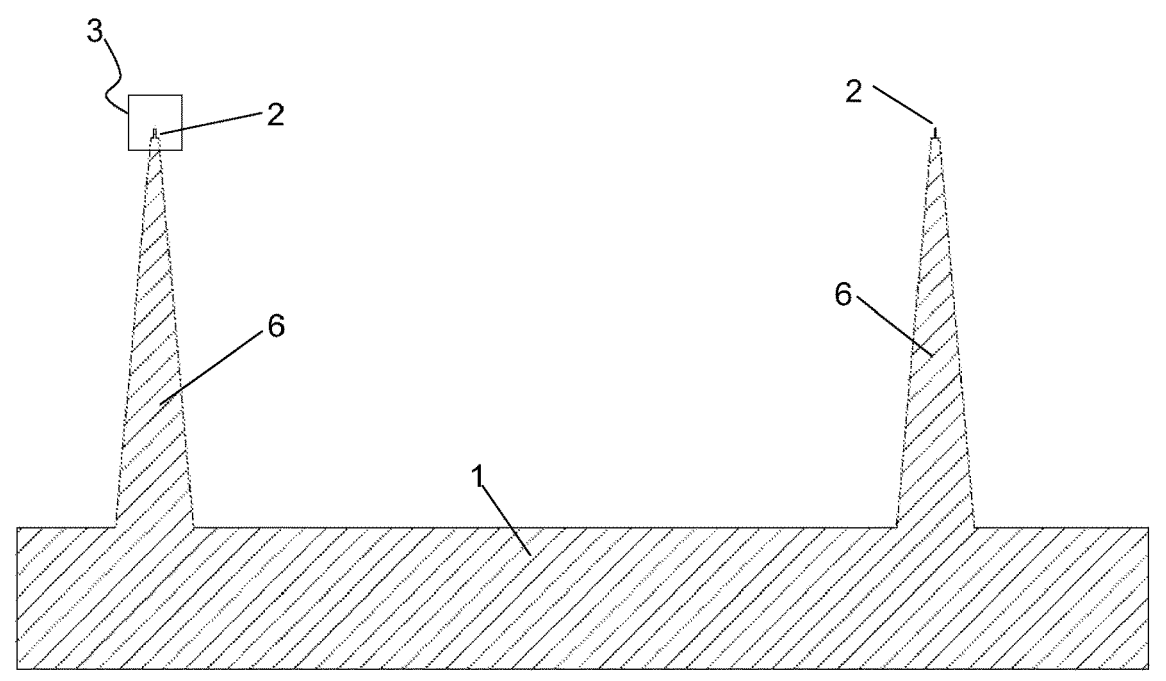
FIGS. 4a and 4b illustrate pedestals comprising a nanotip on their upper surface, obtained after the removal of the mask portions according to the disclosed embodiments.
Figure 4B:
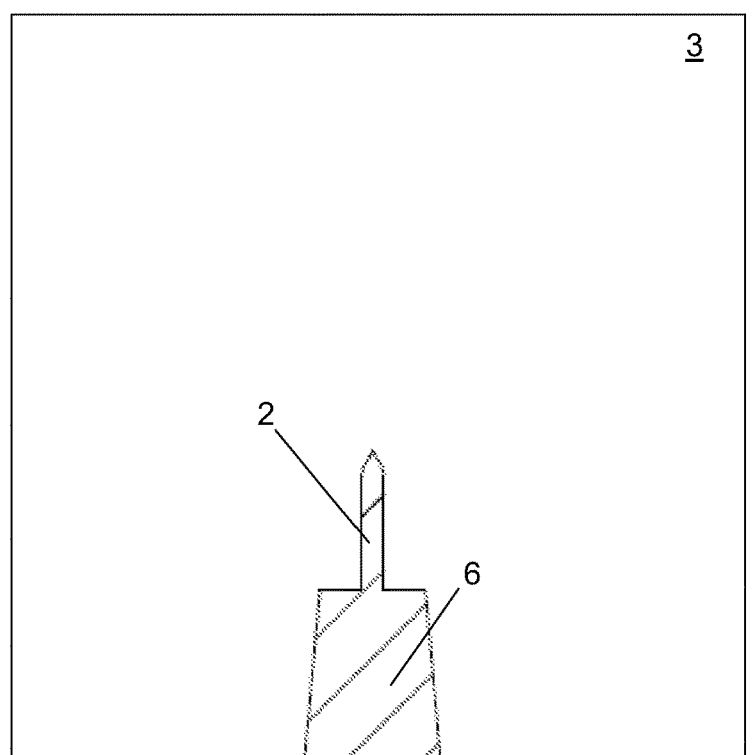

In the next step, the masking portions 5 are removed relative to the tips 2, resulting in an array of pedestals 6, each pedestal carrying a nano-sized tip 2 on its top surface, as illustrated in FIGS. 4a and 4b. From the dimensions described above, it is clear that this process enables the production of millions of these pedestals 6 on the surface of a substrate having a surface area in the order of a few hundred square centimeters. The distance between adjacent pedestals 6 is chosen so as to enable the use of each pedestal/tip combination as an SPM tip that is usable in a reverse-setup SPM measurement, by attaching a sample to a cantilever and moving the sample in contact with or in close vicinity to a tip. The large number of available tips enables the performance of SPM acquisitions basically without requiring any physical/manual tip replacements as would be the case in conventional SPM.

The conical shape of the pedestals 6 is a consequence of the degree of isotropy of the dry etch process. A more anisotropic etch will result in pedestals which are narrower at the bottom. Theoretically, the pedestals could have a cylindrical appearance, which may be approximated especially when the etch depth is significantly less than shown in the example, as will be described later in more detail. These various embodiments may depend on the material of the substrate 1, the etch chemistry, the etch time and/or other parameters. The relation of these parameters to the final shape of the pedestals 6 is understood by persons skilled in the art. The present disclosure is therefore not limited to any particular shape of these pedestals, which may differ for different SPM applications. For example for high-force contact-based SPM such as SSRM which may require a contact pressure of 10-12 GPa, accordingly pedestals with a relatively large base, i.e. a large width at the bottom may be operationally implemented. The upper diameter of the pedestals is however small in each case, as the pedestals carry on their top surface not more than one or a few nanotips 2, for example two, three or four tips, according to embodiments of the present disclosure.

Figure 5C:
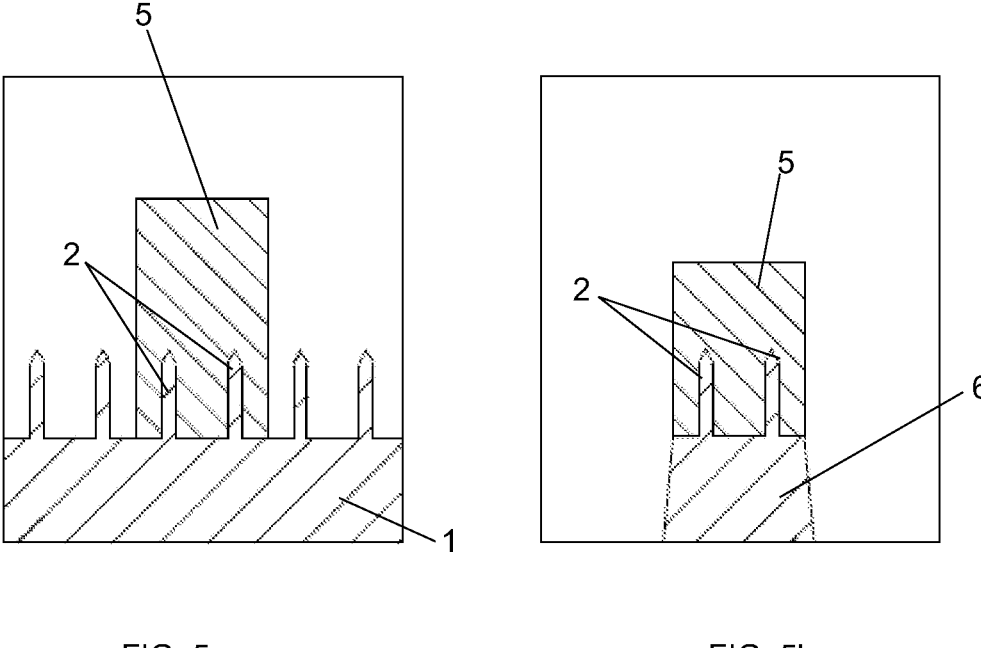
Figure 5C:
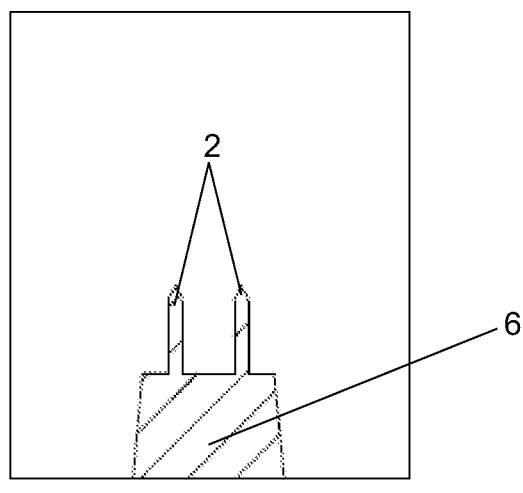

FIGS. 5a to 5c illustrate an embodiment, wherein the mask portions 5 each cover two nanotips 2. This may be useful for example in an SPM configuration wherein material of a sample is removed by scratching the material with the tip.

Figure 6A:
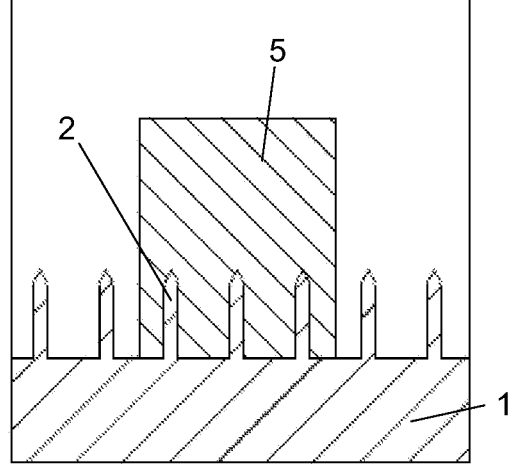
FIGS. 6a to 6c illustrate a variant wherein a mask portion covers multiple nanotips, and wherein during the etching step, the mask material is partially removed from the sides inward according to the disclosed embodiments.
Figure 6B:
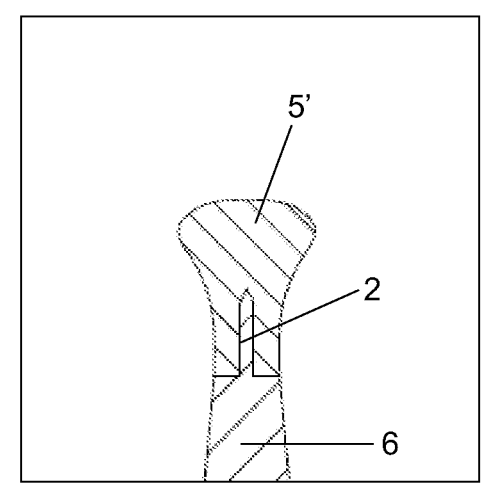
Figure 6C:
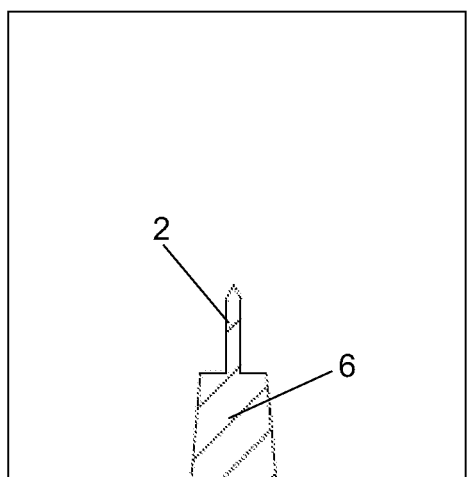
Figure 7A:
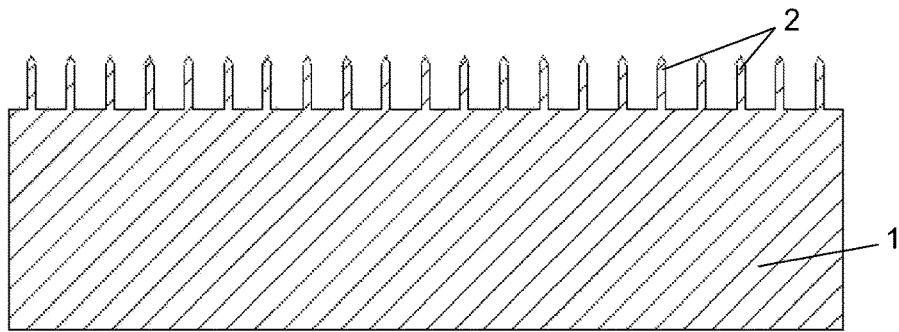
FIGS. 7a to 7d illustrate the method of the present disclosure, applied in a manner to obtain a much denser array of pedestals than in the previously illustrated embodiments.
Figure 7B:
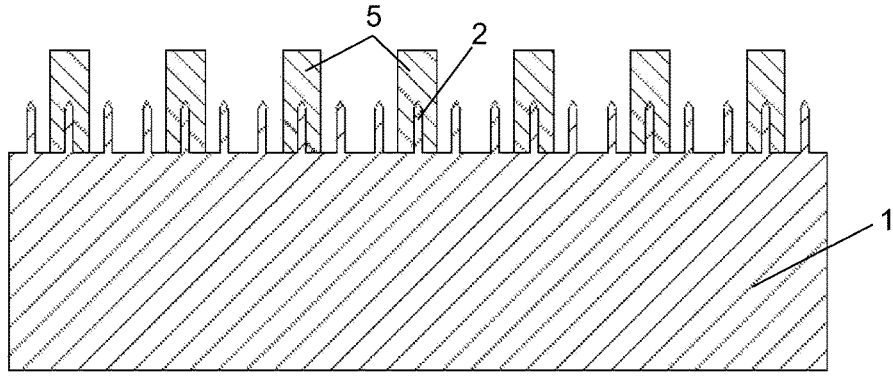
Figure 7C:
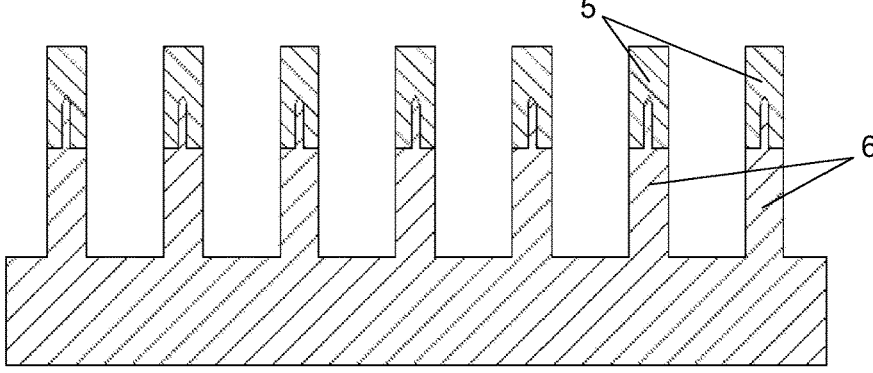
Figure 7D:
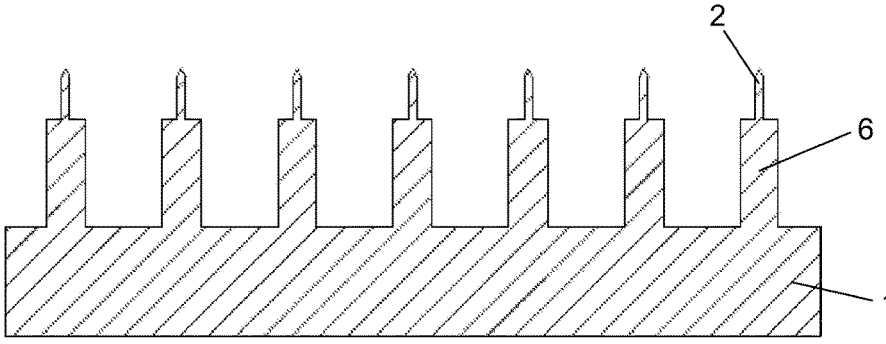

FIGS. 6a to 6c illustrate a further embodiment, wherein the mask portions 5 cover three nanotips 2, and wherein the mask material and the etch chemistry are chosen such that the mask material is partially underetched, i.e. etched from the sides at a higher rate than at the top, leaving a mushroom-shaped mask portion 5' at the end of the etch process. The mask portion 5' covers only one nanotip 2, while the two adjacent tips which were initially covered by the mask portion have been etched away. The mask portions applied in this embodiment could cover more than three tips initially.

According to embodiments of the present disclosure, the positioning of the mask portions 5 relative to the nanotips 2 does not involve an alignment step for aligning the mask portions relative to the nanotips. Due to the high density of the nanotip array, the probability that each mask portion 5 covers at least one nanotip entirely is relatively high. The embodiments shown in FIGS. 5a-5c and 6a-6c increase the probability that at least one nanotip remains underneath the mask portions at the end of the etch process.

Nevertheless, according to other embodiments of the present disclosure, the creation of the mask portions 5 does involve an alignment step, wherein one or more of the mask portions 5 are aligned to particular nanotips 2 of the nanotip array. This may be done by including alignment markers in the lithographic masks used to produce the nanotip array and the array of mask portions 5, for example.

In the embodiments shown so far, the distance between adjacent tips 2 in the array of pedestal/tip combinations is significantly larger than the pitch of the original tip array. This is required for certain SPM applications, such as AFM or SSRM which are most often applied on samples whose dimensions are in the order of micrometers. When samples of such size are attached to a cantilever and moved across the tips, the interspacing between adjacent tips must be in the order of magnitude illustrated in FIG. 4a, for example about 10 μm as in the example shown, or higher, such as up to 25 μm.

When the sample is smaller however, the distance between adjacent tips may also be smaller. An example of the method of the present disclosure applied in that context is illustrated in FIGS. 7a to 7d. The method steps are the same as described above, starting from the same 2-dimensional nanotip array, with tips of about 20 nm in diameter at the base and 120 nm in height, with a pitch of about 100 nm. However, the distance between adjacent mask portions 5 is much smaller, as is also the etch depth applied during the etch step. The pedestals 6 are smaller in height and practically cylindrical in shape, especially when a highly anisotropic etch process is used. The result is an array of closely spaced small pedestals 6, each with a nanotip 2 on their upper surface. A reverse tip SPM measurement using such a closely spaced array of pedestal/tip combinations will require the confinement of a sample on an area having dimensions which are in the same order of magnitude and smaller than the interspacing between the tips 2.

Figure 8:
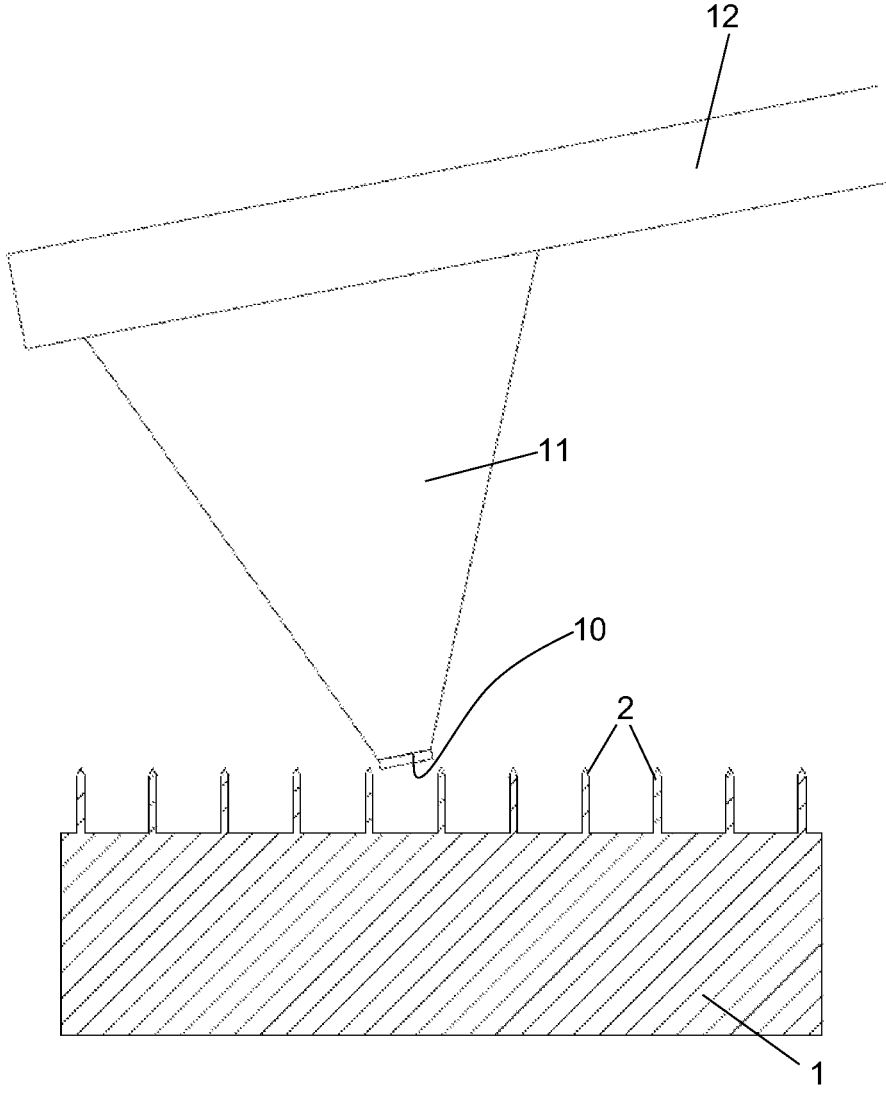
FIG. 8 illustrates the use of a substrate comprising an array of nano-sized tips not located on pedestals, in an SPM measurement on a sample of suitably small dimensions.

An extreme case thereof is the one wherein the original tip array is directly used in the reverse SPM measurement, i.e. without producing the pedestal/tip combinations. The use of such a tip array for this purpose represents another embodiment of the present disclosure and is illustrated in FIG. 8. A sample 10 is placed on the apex area of a tip-shaped carrier 11 attached to the end of a cantilever 12. The dimensions of the sample 10 are in the same order of magnitude, and often smaller than the interspacing between the nanotips 2, so for example the sample in-plane dimensions are between 50 and 100 nm for a tip array having a pitch of 200 nm. Example applications for this particular embodiment may be the probing of small bio-molecule structures by force-distance measurements or the characterization of a confined transistor area shaped by the FIB technique (focused ion beam).

While the eventual pedestal/tip combinations may be arranged according to a regular 2-dimensional array as described above, the present disclosure does not exclude that these combinations are distributed across the substrate surface in a more irregular pattern that would still enable the performance of SPM measurements of one or more measurement types.

As stated, the nanotips 2 may be coated by a functional coating before the mask portions 5 are created. Alternatively, no coating is applied at this time, and a coating step is performed after producing the pedestals 6 and after removing the mask portions 5. According to another alternative, a first coating is applied on the initial array of nanotips 2 prior to the formation of the mask portions 5, and an additional coating is applied on the remaining tips 2 and on the pedestals 6 after the production of the pedestals and the removal of the mask portions.

The distance D can be different from the example value of 10 μm, for example anywhere between 5 and 100 μm, and may be determined for example by the required space for enabling the passage of a cantilever to which a sample is attached that is to be scanned across one or more of the tips.

For electrical SPM applications, the tips need to be connectable to an external voltage or reference. According to an embodiment, an electrically conductive coating is applied on the complete array of pedestal/tip combinations, thereby shorting the multiple tips. The conductive layer can then for example be patterned in an area outside the array of pedestal/tip combinations, in order to produce terminals which can be coupled to an external voltage or reference. According to another embodiment, the substrate comprising electrically conductive pedestal/tip combinations, for example silicon pedestals with a doped diamond coating, can be bonded to a carrier substrate that comprises electrical circuitry configured to connect the tips to a voltage or reference.

According to embodiments of the present disclosure, different types of SPM tips may be fabricated on the same substrate, by performing the method multiple times on different areas of the same substrate, each time covering the remainder of the substrate surface, to thereby produce for example groups of pedestals with different dimensions and interspacings. The substrate could then be used as such for enabling the performance of different SPM type measurements or be divided into multiple smaller substrates or measurement chips, each substrate or chip comprising tips for a particular SPM measurement type.

While the present disclosure has been illustrated and described in detail in the drawings and foregoing description, such illustration and description are to be considered illustrative or exemplary and not restrictive. Other variations to the disclosed embodiments can be understood and effected by those skilled in the art in practicing the claimed present disclosure, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

In the claims as well as in the description of this disclosure, the word "comprising" does not exclude other elements or steps and the indefinite article "a" or "an" does not exclude a plurality. A single element may fulfill the functions of several entities or items recited in the claims. The mere fact that certain measures are recited in the mutual different dependent claims does not indicate that a combination of these measures cannot be used in an advantageous implementation.

What is claimed is:

1. A method for producing a substrate comprising multiple tips for scanning probe microscopy, the method comprising the steps of:
   providing or producing a substrate comprising a plurality of nano-sized tips on its surface, the tips being integral with the material of the substrate, wherein the distance between any two adjacent tips is smaller than 1 micrometer,
   producing a mask on the substrate, the mask comprising a plurality of separate mask portions, wherein each mask portion completely covers at least one nano-sized tip,
   selectively etching the substrate relative to the mask portions, in the region surrounding the mask portions, to thereby obtain a plurality of pedestals, with at least part of the mask portions remaining on top of the pedestals and completely covering at least one tip,
   removing the mask portions, to thereby obtain a plurality of pedestal/tip combinations, each combination comprising one pedestal having at least one nano-sized tip on its upper surface.

2. The method according to claim 1, wherein prior to producing the mask, the plurality of nano-sized tips forms a regular 2-dimensional array of tips.

3. The method according to claim 2, wherein the pedestals are arranged according to a regular two-dimensional array.

4. The method according to claim 2, wherein the tips have a diameter at the base between 10 nm and 50 nm and a height between 50 nm and 800 nm and wherein the distance between any two adjacent tips is between 50 nm and 500 nm.

5. The method according to claim 4, wherein after the removal of the mask portions, each pedestal comprises one tip on its upper surface.

6. The method according to claim 4, wherein the pedestals are arranged according to a regular two-dimensional array.

7. The method according to claim 1, wherein the tips have a diameter at the base between 10 nm and 50 nm and a height between 50 nm and 800 nm and wherein the distance between any two adjacent tips is between 50 nm and 500 nm.

8. The method according to claim 7, wherein the pedestals are arranged according to a regular two-dimensional array.

9. The method according to claim 8, wherein the pitch of the regular array of the pedestals is between 10 μm and 25 μm.

10. The method according to claim 9, wherein after the removal of the mask portions, each pedestal comprises one tip on its upper surface.

11. The method according to claim 10, wherein the pedestals are conical in shape, having a broader base and a narrower top, the top carrying the at least one tip.

12. The method according to claim 1, wherein after the removal of the mask portions, each pedestal comprises one tip on its upper surface.

13. The method according to claim 1, wherein the substrate surface area is at least one hundred square centimeters.

14. The method according to claim 1, wherein the tips comprise a coating at the time of producing the mask portions.

15. The method according to claim 1, wherein a coating is applied on the tips after producing the pedestals and removing the mask portions.

16. The method according to claim 1, wherein at least one mask portion covers multiple nanotips, and wherein the step of selectively etching the substrate is configured to partially underetch the mask portion from the sides, so that a mushroom-shaped mask portion remains at the end of the etch step, the mushroom shaped portion covering at least one but not all of the tips originally covered by the mask portion prior to the etching step.

17. The method according to claim 1, wherein positioning the mask portions relative to the nano-sized tips involves an alignment step so that the mask portions are aligned to respective tips or groups of tips.

18. A substrate comprising a plurality of tips suitable for SPM measurements formed according to claim 1, wherein the substrate comprises a plurality of pedestals, each comprising a base and a top surface, and wherein at least one nano-sized tip is located on the top surface of each pedestal.

19. The substrate according to claim 18, wherein the pedestals are arranged according to a regular two-dimensional array.

20. A method of using of a substrate comprising a plurality of nano-sized tips on its surface, the tips being integral with the material of the substrate and interspaced at distances lower than 1 micrometer from each other, for performing an SPM measurement, by attaching a sample to an apex region of a tip-shaped sample carrier attached at the end of a cantilever, and moving the sample relative to one or more of the tips.

* * * * *